US008887747B2

(12) United States Patent
Kumar et al.

(10) Patent No.: US 8,887,747 B2
(45) Date of Patent: Nov. 18, 2014

(54) SYSTEM AND METHOD FOR DRUM LEVEL CONTROL

(75) Inventors: Rajeeva Kumar, Clifton Park, NY (US); Charles William Weidner, Roanoke, VA (US); Steven Di Palma, Sterling, MA (US)

(73) Assignee: General Electric Company, Niskayuna, NY (US)

( * ) Notice: Subject to any disclaimer, the term of this patent is extended or adjusted under 35 U.S.C. 154(b) by 366 days.

(21) Appl. No.: 13/484,720

(22) Filed: May 31, 2012

(65) Prior Publication Data
US 2013/0319536 A1 Dec. 5, 2013

(51) Int. Cl.
*F17D 3/00* (2006.01)
*F22D 5/30* (2006.01)

(52) U.S. Cl.
CPC .. *F22D 5/30* (2013.01); *Y02E 20/16* (2013.01)
USPC ............................. 137/11; 137/389; 122/448.1

(58) Field of Classification Search
USPC ....................... 137/11, 389; 122/451 R, 448.1
See application file for complete search history.

(56) References Cited

U.S. PATENT DOCUMENTS

| | | | | |
|---|---|---|---|---|
| 1,940,828 A | * | 12/1933 | Veenschoten | 122/451 R |
| 2,895,056 A | * | 7/1959 | Bristol | 122/448.1 |
| 3,138,000 A | * | 6/1964 | Vollmer, Jr. | 122/448.1 |
| 4,242,989 A | | 1/1981 | Chamberlain | |
| 4,437,313 A | | 3/1984 | Taber et al. | |
| 4,457,266 A | * | 7/1984 | La Spisa | 122/451.1 |
| 4,472,355 A | * | 9/1984 | Hickam et al. | 60/670 |
| 4,619,224 A | | 10/1986 | Takita et al. | |
| 4,665,938 A | * | 5/1987 | Brown et al. | 137/487.5 |
| 4,854,121 A | | 8/1989 | Arii et al. | |
| 5,012,429 A | * | 4/1991 | Lantz | 137/395 |
| 5,148,775 A | | 9/1992 | Peet | |
| 5,178,009 A | * | 1/1993 | Arekapudi et al. | 137/389 |
| 5,519,639 A | * | 5/1996 | Jordan et al. | 73/290 R |
| 5,771,846 A | | 6/1998 | Ruchti | |
| 6,148,838 A | * | 11/2000 | Tsay et al. | 137/558 |
| 6,918,356 B2 | * | 7/2005 | Rowe et al. | 122/448.1 |
| 7,053,341 B2 | | 5/2006 | Arora et al. | |
| 7,931,041 B2 | | 4/2011 | Mehendale et al. | |
| 8,397,679 B2 | * | 3/2013 | Kozaki | 122/488 |
| 8,463,445 B2 | * | 6/2013 | Kumar et al. | 137/386 |

(Continued)

OTHER PUBLICATIONS

"Boiler Control Overview";Procidia Application Data; Siemens, 2000; Downloaded from internet:<http://www.cvm.qc.ca/charbono/perso/Cours/Applications/adi-200.pdf>on May 31, 2012;12 Pages.

*Primary Examiner* — Craig Schneider
*Assistant Examiner* — Craig J Price
(74) *Attorney, Agent, or Firm* — Joseph J. Christian

(57) ABSTRACT

A level control system is provided. The system includes multiple sensors configured to measure multiple parameters related to a drum, wherein the multiple parameters include a drum liquid level, a vapor flow rate leaving the drum, a downstream pressure of the drum, and a feed-liquid flow rate entering the drum. The system also includes a level controller configured to adjust a level control valve in accordance with a signal representative of the drum liquid level, a signal representative of the downstream pressure and a signal representative of a given drum liquid level set point. The level controller is further configured to receive a feedback signal representative of a combination of a fraction of the signal representative of the drum liquid level and a fraction of the signal representative of the downstream pressure.

20 Claims, 3 Drawing Sheets

(56) References Cited

U.S. PATENT DOCUMENTS

| | | | |
|---|---|---|---|
| 8,757,105 B2* | 6/2014 | Kumar et al. | 137/11 |
| 2005/0045117 A1* | 3/2005 | Rowe et al. | 122/448.1 |
| 2007/0076838 A1* | 4/2007 | Tomiki et al. | 376/402 |
| 2007/0084418 A1* | 4/2007 | Gurevich | 122/1 B |
| 2010/0139392 A1 | 6/2010 | Kumar et al. | |
| 2011/0295432 A1 | 12/2011 | Kumar et al. | |

* cited by examiner

SYSTEM AND METHOD FOR DRUM LEVEL CONTROL

BACKGROUND

The invention relates generally to a combined cycle operation and more particularly, to a method and system for controlling a drum water level during operation of a heat recovery steam generation (HRSG) system for a combined cycle power plant.

Drum type boilers are the most commonly used boilers in the combined cycle power plants. In power generation industry, drum level trips due to ineffective drum level control response during transient operations are a primary cause of disruption in power generation and lead to a huge loss of plant availability and revenue.

Control of drum water level is a challenging problem due to complicated dynamics of two-phase flows, presence of waves, unknown heat and pressure disturbances, and load demands. Maintaining water level within limits is critical, as exceeding the limits will lead to trips or damage the equipment. A drop in water level will cause thermal fatigue in the drum. An increase in water level significantly increases the possibility of water droplets entering a superheater/steam turbine and thus damaging the superheater/steam turbine.

Conventional approaches to control of water level typically include actuation of a feed water control valve that supplies water to the drum in reaction to observed changes in level and steam flowrate. However, such approaches to control water level are challenging for drum type boilers, especially during transient operating conditions due to inverse response exhibited by such systems. The disturbance rejection responses of level controllers of existing systems are inadequate to handle such pressure disturbances arising from bypass operations.

There is therefore a need for a more effective technique for controlling a liquid level in a vessel, such as for example, control of liquid level in a drum type boiler, especially during transient operating conditions.

BRIEF DESCRIPTION

In accordance with an embodiment of the invention, a level control system is provided. The system includes multiple sensors configured to measure multiple parameters related to a drum, wherein the multiple parameters include a drum liquid level, a vapor flow rate leaving the drum, a downstream pressure of the drum, and a feed-liquid flow rate entering the drum. The system also includes a level controller configured to adjust a level control valve in accordance with a signal representative of the drum liquid level, a signal representative of the downstream pressure and a signal representative of a given drum liquid level set point. The level controller is further configured to receive a feedback signal representative of a combination of a fraction of the signal representative of the drum liquid level and a fraction of the signal representative of the downstream pressure.

In accordance with an embodiment of the invention, a level control system for controlling a liquid level in a drum containing a two-phase fluid is provided. The level control system includes multiple sensors configured to measure multiple parameters related to the drum, wherein the multiple parameters include a drum liquid level, a vapor flow rate leaving the drum, a downstream pressure of the drum, and a feed-liquid flow rate entering the drum. The level control system also includes a level controller configured to modify a liquid level set point of the drum based on output signals at high frequency measured from one of the plurality of sensors, wherein the level controller is configured to change a liquid level in the drum based on the modified liquid level set point by manipulating a control element coupled to the drum.

In accordance with an embodiment of the invention, a method for controlling a liquid level in a drum containing a two-phase fluid is provided. The method includes obtaining multiple sensing parameters related to the drum via a plurality of sensors; wherein sensing parameters comprises sensing drum liquid level, vapor flow rate leaving the drum, pressure in the drum, downstream pressure, and feed-liquid flow rate entering the drum indicative of a state of the drum. The method also includes receiving a feedback signal by a level controller, wherein the feedback signal is representative of a combination of a fraction of a signal representative of the drum liquid level at low frequency and a fraction of a signal representative of the downstream pressure at high frequency. The method further includes adjusting a level control valve in accordance with the feedback signal, a signal representative of the vapor flow rate leaving the drum, a signal representative of the feed-liquid flow rate entering the drum and a signal representative of a given drum level set point. Finally, the method includes controlling the drum level at the given drum level set point.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
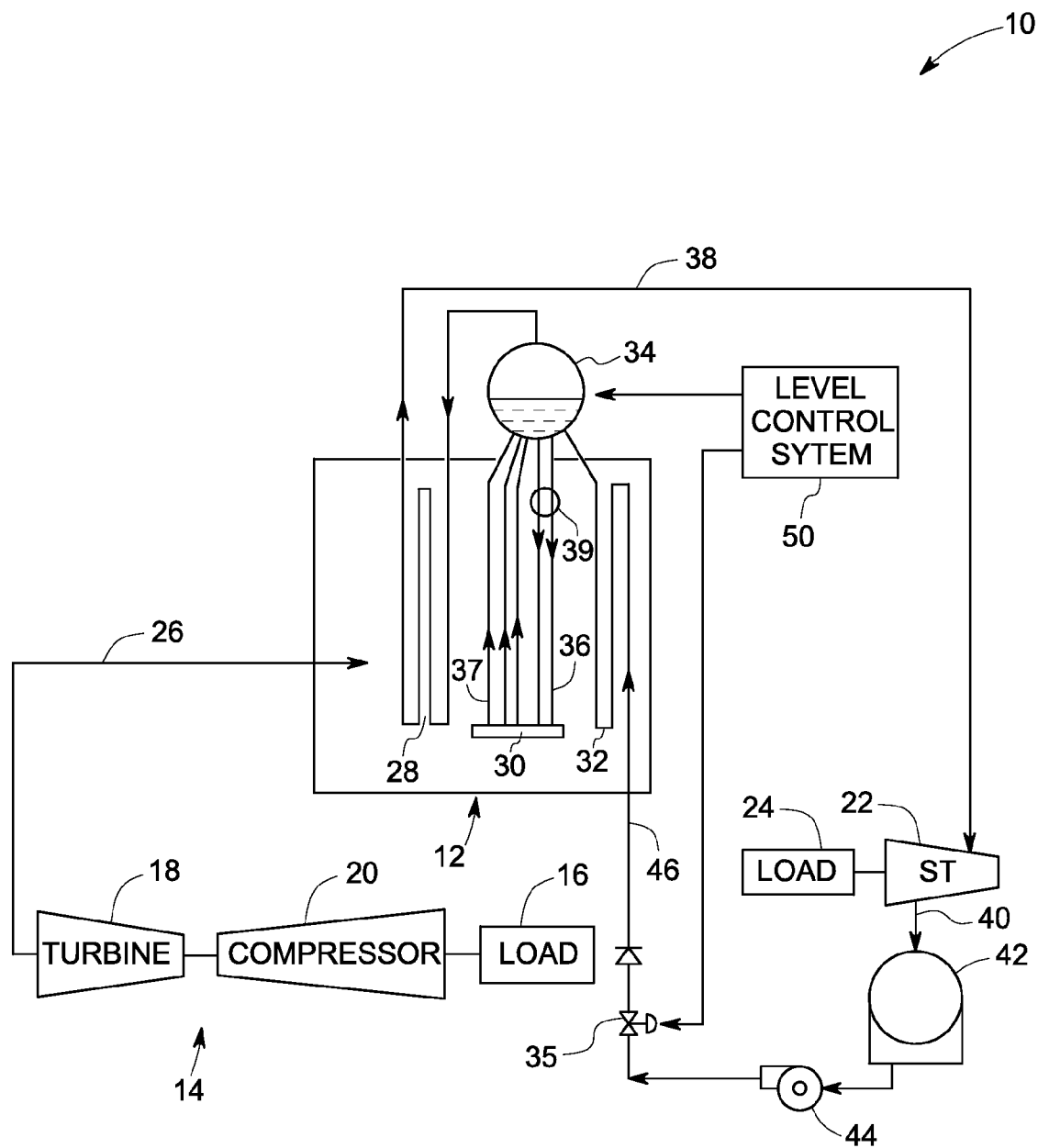
FIG. 1 is a schematic representation of a combined cycle power plant having a boiler drum with a liquid level control system in accordance with an embodiment of the present invention.

FIG. 1 is a schematic flow diagram of an exemplary embodiment of a combined cycle power generation system 10 having a HRSG system 12. The system 10 includes a gas turbine 14 for driving a first load 16. The gas turbine 14 typically includes a turbine 18 and a compressor 20. The system 10 also includes a steam turbine 22 for driving a second load 24. In one embodiment, the first load 16 and the second load 24 includes an electrical generator for generating electrical power. In another embodiment, the first load 16 and the second load 24 includes other types of loads capable of being driven by the gas turbine 14 and steam turbine 22. In addition, the gas turbine 14 and steam turbine 22 may also be utilized in tandem to drive a single load via a single shaft. In one embodiment, the steam turbine 22 includes a low-pressure stage, an intermediate-pressure stage, and a high-pressure stage. However, the specific configuration of the steam turbine 22, as well as the gas turbine 14, may be implementation-specific and may include any combination of stages.

As illustrated in FIG. 1, the combined cycle power generation system 10 includes a multi-stage heat recovery steam generator (HRSG) system 12. The HRSG system 12 is a simplified depiction of a general operation and is not intended to be limiting. The HRSG system 12 receives hot exhaust gases 26 from the gas turbine 14 for heating water and steam. The typical HRSG system, aside from a duct through which the hot exhaust gases 26 pass, in its most basic form, includes three additional components: a superheater 28, an evaporator 30, and an economizer 32 or feedwater heater arranged in an order with respect to the flow of exhaust gases 26 in the duct. The HRSG system 12 includes multiple downcomer tubes 36 and multiple evaporator tubes 37. The economiser 32 and the superheater 28 also includes multiple tubes for water or steam flow in the HRSG system 12. Further, the HRSG system 12 includes a boiler drum 34. A boiler feed pump 44 is configured to supply feed water to the boiler drum 34 via a feed water control valve 35. The function of the boiler drum 34 is to provide a stable amount of water to the evaporator 30 through the multiple downcomer tubes 36 and also to accumulate heat energy for compensating the changes in steam generated or consumed. Steam generated in the HRSG system 12 is supplied to the steam turbine 22 through a line 38.

Furthermore, exhaust 40 from the steam turbine 22 is directed to a condensor 42. Condensate from the condenser 42 may, in turn, be directed into the HRSG 12 with the aid of the boiler feed pump 44 through a line 46. The condensate flowing through the economiser 32 is heated, but remains a liquid, and then fed to the boiler drum 34. The condensate may also be passed through a deaerator (not shown) before flowing into the economiser 32 for the removal of air and other dissolved gases. The water accumulated in the boiler drum 34 is then passed through the evaporator 30 for converting into saturated steam, and then through the superheater 28, which superheater 28 converts the saturated steam into superheated steam. In one embodiment, the HRSG system 12 may include a low pressure stage, an intermediate pressure stage and a high pressure stage.

To maintain the safe operation of the boiler drum 34, the HRSG system 12 includes a level control system 50 that has a level controller for controlling the water level of the boiler drum 34 by supplying water into the boiler drum or blowing down water based on a comparison between an optimal drum water level in the boiler drum 34 and an actual water level of the boiler drum 34 during operation of the HRSG system 12. In one embodiment, the boiler drum 34 includes an optimum sized blow down valve 39 for controlling the swell during the operation of the HRSG system 12. The level control system 50 includes a plurality of sensors that are configured to measure a plurality of parameters related to the boiler drum 34, wherein the plurality of parameters comprise a drum liquid level, a vapor flow rate leaving the drum, a downstream pressure of the drum, and a feed-liquid flow rate entering the drum. The level controller is configured to adjust a level control valve or feed water control valve 35 in accordance with a signal representative of the drum liquid level, a signal representative of the downstream pressure, a signal representative of the vapor flow rate leaving the drum, a signal representative of the feed-liquid flow rate entering the drum and a signal representative of a given drum liquid level set point. The level controller of the level control system 50 is described in details in FIG. 2.

Figure 2:
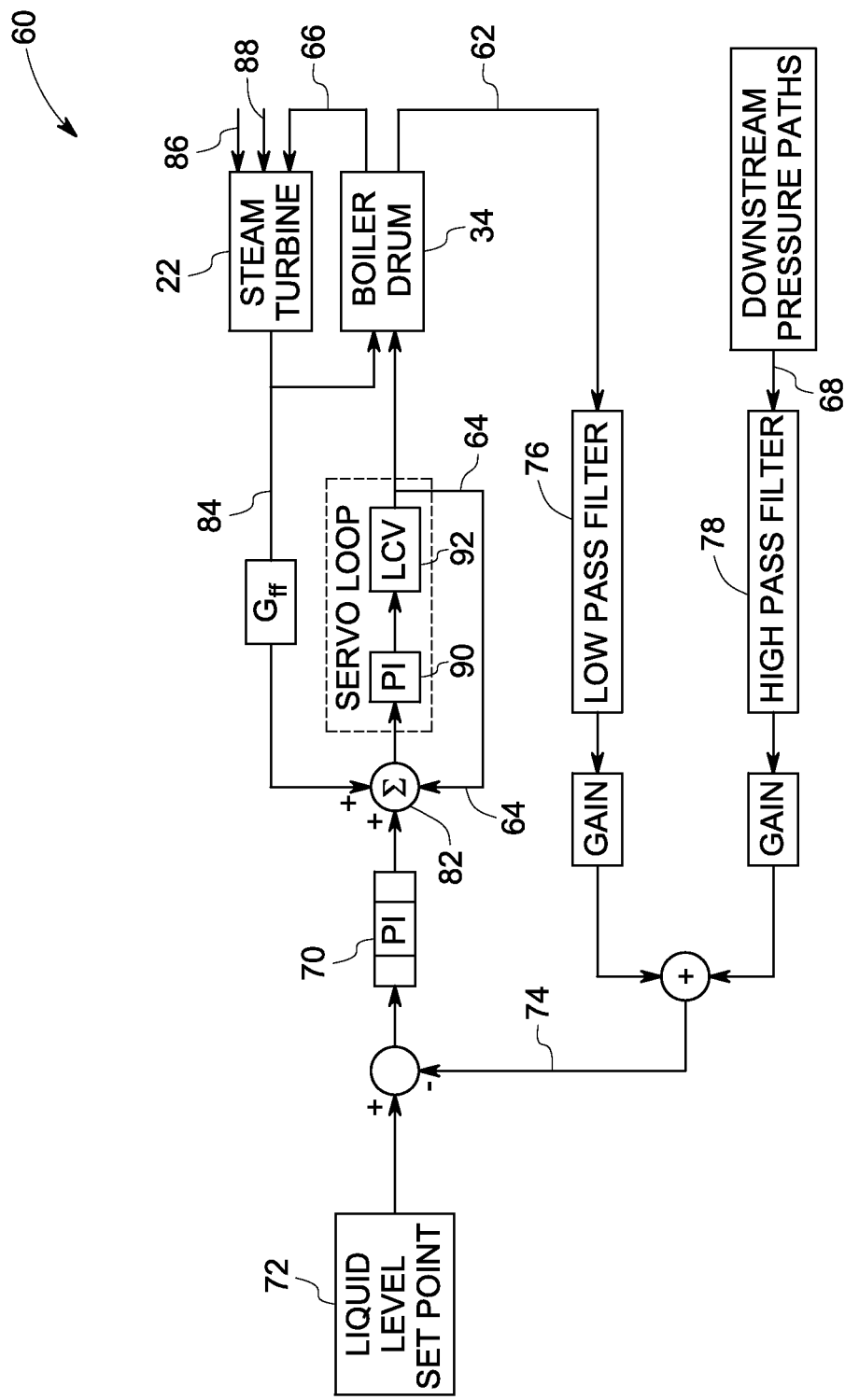
FIG. 2 is a schematic representation of a drum level controller in accordance with an embodiment of the present invention.

FIG. 2 is a schematic representation of a drum level controller 60 in accordance with an embodiment of the present invention. The drum level controller 60 is a four-element controller that uses a drum water level signal 62, a feed water flow signal 64, steam flow signal 66 and downstream pressure signal 68 from the boiler drum 34 (as shown in FIG. 1) as variables for controlling water level in the boiler drum 34 in both steady state conditions and in process upset conditions such as high frequency disturbances. The drum level controller 60 includes a first drum level PI (Proportional Integral) controller 70 that uses a uses a given drum liquid level setpoint 72 and a feedback signal 74 to provide an output that is summed with an output from a low pass filter, $G_{lf}$ and the feed water flow signal 64 at summer 82. The feedback signal 74 is a representative of a combination of a fraction of the drum water level signal 62 and a fraction of the downstream pressure signal 68. The drum water level signal 62 is normally at a low frequency derived from one of the plurality of sensors measuring the drum liquid level within the drum. The downstream pressure signal 68 is generally at a high frequency derived from of one or more sensors measuring the downstream pressure of the boiler drum 34 at pressure paths in the superheater 28 (shown in FIG. 1) or in the downcomer tubes 36 (as shown in FIG. 1). Prior to combining the drum water level signal 62 and the downstream pressure signal 68 for forming the feedback signal 74, the drum water level signal 62 is first passed through a low pass filter 76 and then a gain is added. Further, the downstream pressure signal 68 is passed through a high pass filter 78 and then a gain is added thereafter.

In one embodiment, the low pass filter $G_{lf}$ is configured to provide delay in the steam flow signal 66 and further delay in an input signal 84. The input signal 84 include the steam flow signal 66 from the boiler drum 34 into the steam turbine 22, a boiler drum pressure signal 86 and a mass control valve signal 88. The output of summer 82 is provided as an input that is used as a setpoint for feed water flow to a flow control PI controller 90 in a cascaded arrangement. The output of summer 82 results in a feedwater demand signal that does not respond to sudden changes in steam flow signal 66, thereby, preventing any initial fluctuations in the feedwater demand signal. The output of flow control PI controller 90 drives a drum level control valve (LCV) 92. Both the flow control PI controller 90 and the LCV 92 operates as a servo loop for determining a required amount of feed water flow for controlling the drum liquid level at the given drum liquid level setpoint 72.

In one embodiment, the drum level controller 60 is configured to modify the liquid level set point of the drum 72 based on output signals at high frequency measured from one of the plurality of sensors. The output signals at high frequency are the downstream pressure signals 68. The drum level controller 60 is further configured to change a liquid level in the boiler drum 34 based on the modified liquid level set point by manipulating one or more control elements coupled to the drum such as the LCV 92. In one embodiment, the manipulating of one or more control elements coupled to the drum is performed manually, automatically, or combinations thereof. The one or more control elements include a pressure control valve, blow down valve, feed-water control valve, or combinations thereof coupled to the boiler drum 34.

Figure 3:
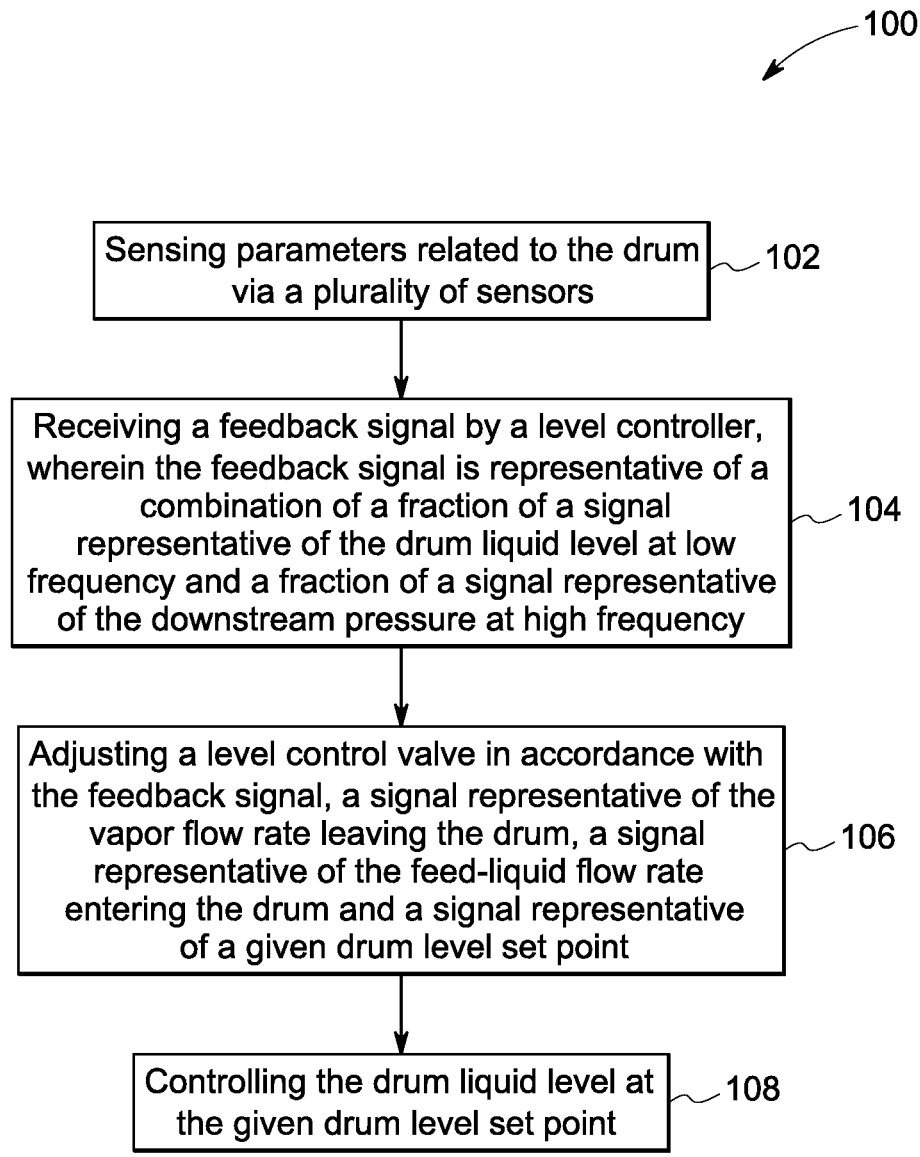
FIG. 3 is flow chart illustrating exemplary steps involved in method of controlling liquid level in a drum in accordance with an embodiment of the present invention.

FIG. 3 is flow chart 100 illustrating steps involved in method of controlling liquid level in a boiler drum in accordance with an embodiment of the present invention. At step 102, the method includes obtaining multiple sensing parameters related to the boiler drum via a plurality of sensors. The sensing parameters includes drum liquid level, vapor flow rate leaving the drum, pressure in the drum, downstream pressure, and feed-liquid flow rate entering the drum indicative of a state of the drum. At step 104, the method includes receiving a feedback signal by a level controller, wherein the feedback signal is representative of a combination of a fraction of a signal representative of the drum liquid level at low frequency and a fraction of a signal representative of the downstream pressure at high frequency. Prior to combining the signal representative of the drum liquid level at low frequency and the signal representative of the downstream pressure at high frequency, the method includes passing the signal representative of the drum liquid level through a low pass filter and adding a gain. The method also includes passing the signal representative of the downstream pressure at high frequency through a high pass filter and further adding a gain. Further, at step 106, the method includes adjusting a level control valve in accordance with the feedback signal, a signal representative of the vapor flow rate leaving the drum, a signal representative of the feed-liquid flow rate entering the drum and a signal representative of a given drum level set point. Finally, the method includes controlling the drum liquid level at the given drum level set point at step 108.

In one embodiment, the method includes modifying a liquid level set point of the drum based on output signals representative of the downstream pressure at high frequency measured from one of the plurality of sensors. This method may further include controlling the liquid level in the drum based on the modified liquid level set point by manipulating one or more control elements coupled to the drum. The manipulation of the one or more control elements coupled to the drum is performed manually, automatically, or combinations thereof.

Advantageously, the present invention enables adequate drum liquid level responses to high frequency pressure disturbances and prevents unwanted drum related HRSG trips. Thus, the present invention effectively controls the liquid levels in drums by incorporating the downstream pressure signals in the drum level controller to adjust one or more control elements associated with the drum, especially during transient operating conditions that leads to high frequency pressure disturbances arising from bypass operations.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A level control system comprising:
    a plurality of sensors configured to measure a plurality of parameters related to a drum, wherein the plurality of parameters comprise a drum liquid level, a vapor flow rate leaving the drum, a downstream pressure of the drum, and a feed-liquid flow rate entering the drum; and
    a level controller configured to adjust a level control valve in accordance with a signal representative of the drum liquid level, a signal representative of the downstream pressure and a signal representative of a given drum liquid level set point,
        wherein the level controller is configured to receive a feedback signal representative of a combination of a fraction of the signal representative of the drum liquid level and a fraction of the signal representative of the downstream pressure.

2. The system of claim 1, wherein the signal representative of the drum liquid level is at a low frequency derived from one of the plurality of sensors measuring the drum liquid level within the drum.

3. The system of claim 2, wherein the level controller is configured to pass the signal representative of the drum liquid level through a low pass filter.

4. The system of claim 3, wherein the level controller is further configured to add a gain to the signal representative of the drum liquid level after being passed through the low pass filter.

5. The system of claim 1, wherein the signal representative of the downstream pressure is at a high frequency derived from one of the plurality of sensors measuring the downstream pressure of the drum.

6. The system of claim 5, wherein the level controller is configured to pass the signal representative of the downstream pressure through a high pass filter.

7. The system of claim 6, wherein the level controller is further configured to add a gain to the signal representative of the downstream pressure after being passed through the high pass filter.

8. The system of claim 1, wherein the level controller comprises a cascaded Proportional Integral (PI) flow control for controlling the level control valve.

9. A level control system for controlling a liquid level in a drum containing a two-phase fluid, the system comprising:
    a plurality of sensors configured to measure a plurality of parameters related to the drum, wherein the plurality of parameters comprise a drum liquid level, a vapor flow rate leaving the drum, a downstream pressure of the drum, and a feed-liquid flow rate entering the drum; and
    a level controller configured to modify a liquid level set point of the drum based on output signals at high frequency measured from one of the plurality of sensors, wherein the level controller is configured to change a liquid level in the drum based on the modified liquid level set point by manipulating one or more control elements coupled to the drum.

10. The system of claim 9, wherein the level controller is configured to pass the output signals at high frequency through a high pass filter.

11. The system of claim 10, wherein the level controller is further configured to add a gain to the output signals at high frequency after being passed through the high pass filter.

12. The system of claim 9, wherein the output signals at high frequency comprises of superheater pressure signals or drum pressure signals or pressure signals in downcomer tubes of evaporator.

13. The system of claim 9, wherein the one or more control elements comprises a pressure control valve, blow down valve, feed-water control valve, or combinations thereof coupled to the boiler drum.

14. A method for controlling a liquid level in a drum containing a two-phase fluid, the method comprising:
    obtaining a plurality of sensing parameters related to the drum via a plurality of sensors; wherein sensing parameters comprises sensing drum liquid level, vapor flow rate leaving the drum, pressure in the drum, downstream pressure, and feed-liquid flow rate entering the drum indicative of a state of the drum;

receiving a feedback signal by a level controller, wherein the feedback signal is representative of a combination of a fraction of a signal representative of the drum liquid level at low frequency and a fraction of a signal representative of the downstream pressure at high frequency, adjusting a level control valve in accordance with the feedback signal, a signal representative of the vapor flow rate leaving the drum, a signal representative of the feed-liquid flow rate entering the drum and a signal representative of a given drum level set point, and controlling the drum liquid level at the given drum level set point.

15. The method of claim 14, further comprising passing the signal representative of the drum liquid level at low frequency through a low pass filter and further adding a gain.

16. The method of claim 15, further comprising passing the signal representative of the downstream pressure at high frequency through a high pass filter and further adding a gain.

17. The method of claim 14, further comprising modifying a liquid level set point of the drum based on output signals representative of the downstream pressure at high frequency measured from one of the plurality of sensors.

18. The method of claim 17, further comprising controlling the liquid level in the drum based on the modified liquid level set point by manipulating one or more control elements coupled to the drum.

19. The method of claim 18, wherein manipulating the one or more control elements coupled to the drum is performed manually, automatically, or combinations thereof.

20. The method of claim 18, wherein the one or more control elements includes a pressure control valve, blow down valve, feed-water control valve, or combinations thereof coupled to the boiler drum.

* * * * *